United States Patent [19]
Edwards et al.

[11] Patent Number: 5,820,744
[45] Date of Patent: Oct. 13, 1998

[54] ELECTROCHEMICAL MACHINING METHOD AND APPARATUS

[75] Inventors: Clifton Vedantus Edwards; Frank P. Simkowski, both of Ivoryton, Conn.

[73] Assignee: Doncasters, Turbo Products Division, Ivoryton, Conn.

[21] Appl. No.: 721,761

[22] Filed: Sep. 30, 1996

[51] Int. Cl.[6] .............................. B23H 3/00; B23H 9/14; B23H 7/32

[52] U.S. Cl. ......................... 205/640; 205/645; 205/652; 205/665; 205/672; 204/224 M; 204/225

[58] Field of Search .............................. 204/224 M, 225; 205/672, 640, 665, 652, 645

[56] References Cited

U.S. PATENT DOCUMENTS

| | | |
|---|---|---|
| 3,293,163 | 12/1966 | O'Connor . |
| 3,357,906 | 12/1967 | Jollis et al. .............................. 205/645 |
| 3,365,381 | 1/1968 | Fromson . |
| 3,399,125 | 8/1968 | Mikoshiba et al. .................. 205/672 X |
| 3,627,667 | 12/1971 | Plofsky . |
| 3,723,268 | 3/1973 | Johns et al . |
| 3,842,658 | 10/1974 | Ellis et al. . |
| 3,990,959 | 11/1976 | Payne et al. . |
| 4,167,462 | 9/1979 | Schrader et al. . |
| 4,213,834 | 7/1980 | Semashko et al. . |
| 4,387,009 | 6/1983 | Gardner et al. . |
| 4,475,995 | 10/1984 | Ziegler et al. . |
| 4,995,949 | 2/1991 | Rhoades . |
| 5,122,242 | 6/1992 | Slysh ..................................... 205/672 X |
| 5,225,053 | 7/1993 | Frembgen . |
| 5,306,401 | 4/1994 | Fierkens et al. . |
| 5,320,721 | 6/1994 | Peters . |
| 5,322,599 | 6/1994 | Peters ................................... 205/665 X |
| 5,373,449 | 12/1994 | Baker . |

FOREIGN PATENT DOCUMENTS

0457975 A1  11/1991  European Pat. Off. .

OTHER PUBLICATIONS

Clifton, et al. "an Adaptive Control System for Fine Hole Drilling" (4 page) Nov. 1988.
Copy of International Search Report, mailed 12/02/98 (2 p.).
Turbo Products, SD1A Stem Drill, Ace 94 17 34.0, 16 May 1994.
Electrochemical Machining Compressor Blades and Vanes, Dreher, Donald J., Society of Manufacturing Engineers, 1986 (No month).
Stem Drilling Update, Newton, M. Anthony, Society of Manufacturing Engineers, 1985 (No Month).
Shaped Tube Electrolytic Machining, Newton, Anthony M. Nltech, Inc., (No Date).

*Primary Examiner*—Donald R. Valentine
*Attorney, Agent, or Firm*—Cummings & Lockwood

[57] ABSTRACT

Electrochemical machining (ECM) techniques utilizing real-time parameter monitoring, alarms and feedback control for improved machining of a workpiece are disclosed. The ECM device utilizes one or more cathodes, an electrolyte and a positively charged workpiece to achieve electrolytic action. A number of controlling variables, such as cathode feed rate, electrolyte flow rate and voltage, are balanced in response to measured system parameters. The following parameters are preferably monitored in order to adjust the controlling variables: the drive parameters of feed rate and cathode depth; the pump parameters of flow rate and pressure; and the power components of voltage and current. The flow rate in each of the cathodes, or a corresponding Reynolds number, is preferably utilized to provide an alarm to the operator if a statistically significant change in flow is detected. The dynamic fluid resistance gradient across one or more of the gaps being machined is utilized to approximate the desired shape of the workpiece being machined in real time. The dynamic electrical resistance may be utilized to improve the shape approximation. The approximated shape values are utilized to provide feedback control of one or more of the controlling variables to obtain improved results. The dynamic fluid resistance is the difference between the total measured fluid resistance and the static fluid resistance, as obtained during a calibration procedure.

41 Claims, 8 Drawing Sheets

500

```
        ┌─────────────────────────┐
        │   CALCULATE DYNAMIC     │
        │   FLUID RESISTANCE      │
        └───────────┬─────────────┘
                    ▼
```

CALCULATE REYNOLDS NUMBER, VD, FOR EACH TUBE:

$$VD_i = \frac{Q_i}{A_{TUBE_i}} \times DIAM_{IN_i}$$

~510

OBTAIN STATIC RESISTANCE VALUES FROM CALIBRATION DATA BASED ON REYNOLDS NUMBERS

~520

CALCULATE TOTAL FLUID RESISTANCE FOR EACH CATHODE:

$$R^Q_{TOTAL_i} = \frac{P_{TOTAL}}{C\left[Q_i/A_{ANN}\right]^2}$$

~530

$$R^Q_{DYN_i} = R^Q_{TOTAL_i} - R^Q_{STATIC_i}$$

~540

AMALGAMATE INDIVIDUAL $R^Q_{DYN_i}$ TO OBTAIN DYNAMIC FLUID RESISTANCE, $R^Q_{DYN}$

~550

OBTAIN HOLE DIAMETER APPROXIMATION, $H^Q_{DIAM}$, BASED ON THE SLOPE OF $R^Q_{DYN}$ WITH DEPTH, $\frac{dR^Q_{DYN}}{dz}$

~560

( RETURN )~570

FIG. 5

ELECTROCHEMICAL MACHINING METHOD AND APPARATUS

FIELD OF THE INVENTION

The present invention relates to electrochemical machining techniques for removing metal from a workpiece, and more particularly, to techniques for monitoring and adaptively controlling parameters in an electrochemical machining system.

BACKGROUND OF THE INVENTION

Well known electrochemical machining ("ECM") processes employ electrolytic action to remove electrically conductive material from a workpiece by dissolving the metal in a rapidly flowing electrolyte. In such electrochemical processes, electrical energy is combined with a chemical to form a reaction of reverse plating. Dissolved material is removed from the gap between the positively charged workpiece and a negatively charged cathode tool by the electrolyte flow.

One particular application of electrochemical machining is Shaped Tube Electrolytic Machining ("STEM"), which is particularly suitable for drilling small holes with large depth-to-diameter ratios, such as cooling passages in turbine blades. While conventional ECM processes typically utilize a salt solution as the electrolyte, STEM processes utilize an acid electrolyte to ensure that the metal is dissolved and will not create an electrical bridge in the tight confines of the gap and annulus between the cathode tool and the hold being drilled. In this manner, material removed from the workpiece is dissolved into solution in the electrolyte instead of forming a sludge which could clog the small holes being drilled.

STEM systems utilize one or more negatively charged titanium tubes having an outside insulating coating, an electrolyte, and a positively charged workpiece. The electrolyte is pumped through the electrode tubes and exits via the narrow gap between the electrode tube and the hole being drilled in the workpiece. The created electrical path, as the cathodes advance towards the workpiece at the bottom of the hole, causes the metal to break down, be dissolved, and to attempt to plate out on the cathode tip. However, before the metal can plate on the tip, it is washed away by the flowing electrolyte. The electrolyte then continues up the annulus between the holes that have just been cut and the outside of the cathode until it leaves the hole at atmospheric pressure. Thus, the annulus created between the outer diameter of the cathode and the hole it makes provides a flow path for the electrolyte to escape back to the pumping system. For a more detailed discussion of ECM and STEM processes, see Machining Data Handbook, Institute of Advanced Manufacturing Science, Vol. 2, Chapter 11 (3d ed., 1980), incorporated herein by reference.

There are a number of parameters which affect the performance of an ECM machine and the quality of the machined part which the ECM machine produces. For example, the quality and straightness of holes being drilled depends primarily on three variables: the voltage at the cutting gap, the feed rate of the cathodes and the properties and flow rate of the circulating electrolyte. In conventional ECM and STEM systems the initial parameters are typically set conservatively and then x-rays of the machined part are evaluated after the cut is complete. Since it is difficult with conventional STEM systems to evaluate the hole being drilled while the cutting operation is being performed, and it is undesirable to make changes that would narrow the hole diameter and thereby create a bulb in the part or cause the cathode to burn up, few adjustments are made to the parameters during the cutting operation. As a result of this conservative approach, holes machined with conventional STEM systems tended to increase in diameter with depth.

It is likewise difficult with conventional ECM systems to evaluate the shape being machined while the cutting operation is being performed, and it is undesirable to make changes that would reduce the gap between the electrodes and the workpiece and thereby create the possibility of sparking due to contact between the electrodes and the workpiece. This conservative approach tends to slow down the ECM process and impact the quality of the final part. In addition, any information observable by the operator in either an ECM or STEM system, such as cathode bends, are after-the-fact indicators that the gap between the cathode and the workpiece is reducing and thereby impacting the quality of the machined part.

As is apparent from the above discussion, a need exists for the ability to monitor ECM process parameters in real time. A further need exists for the ability to approximate the shape of a workpiece being machined in real time, including the diameter of a hole being cut using a STEM process. Yet another need exists for the ability to adjust the process parameters during the cutting operation in response to the approximated shape of the machined part to improve uniformity and quality of the final machined part.

SUMMARY OF THE INVENTION

Generally, according to aspects of the present invention, an electrochemical machining device is provided for electrochemically machining an anodic workpiece to a desired geometry. The electrochemical machining device includes one or more cathode tools for machining the workpiece, a power supply system to create an electrical potential between the cathodes and the workpiece; a drive system to move and guide the cathode tools towards the workpiece; an electrolyte system to store and distribute the electrolyte throughout the device, a holding fixture to position and secure the workpiece during the machining operation and a controller.

According to one feature of the invention, the controller monitors a number of system parameters in real time and provides alarm features and feedback control by means of an adaptive control loop to achieve more accurate machining of the workpiece and to avoid a failure before it occurs. In a preferred embodiment, the controller monitors the following parameters in order to adjust the controlling variables: the drive parameters of feed rate and cathode depth; the pump parameters of flow rate and pressure; and the power components of voltage and current. The controller preferably balances a number of controlling variables, such as drive feed rate, electrolyte flow rate and voltage, in response to current system parameters. The flow rate in each of the cathode tools is preferably utilized to provide an alarm to the operator if a statistically significant change in flow is detected.

According to another feature of the invention, the dynamic fluid resistance through the machining area is utilized to approximate the shape of the workpiece being machined in real time. It has been found that the flow resistance gradient, or the slope of the dynamic fluid resistance with depth, correlates with the geometry of the machining area. Thus, the flow resistance gradient is used to provide feedback control of the electrochemical machining process. The approximated shape can be effectively utilized to provide feedback control of one or more of the controlling variables to obtain improved results.

A more complete understanding of the present invention, as well as further features and advantages of the invention, will be obtained by reference to the detailed description and drawings.

BRIEF DESCRIPTION OF THE DRAWINGS

FIG. 5 is a flow chart describing an exemplary technique for calculating dynamic fluid resistance, $R^Q_{DYN}$, as utilized by the monitor and control process of FIG. 3;

DETAILED DESCRIPTION

Figure 1:
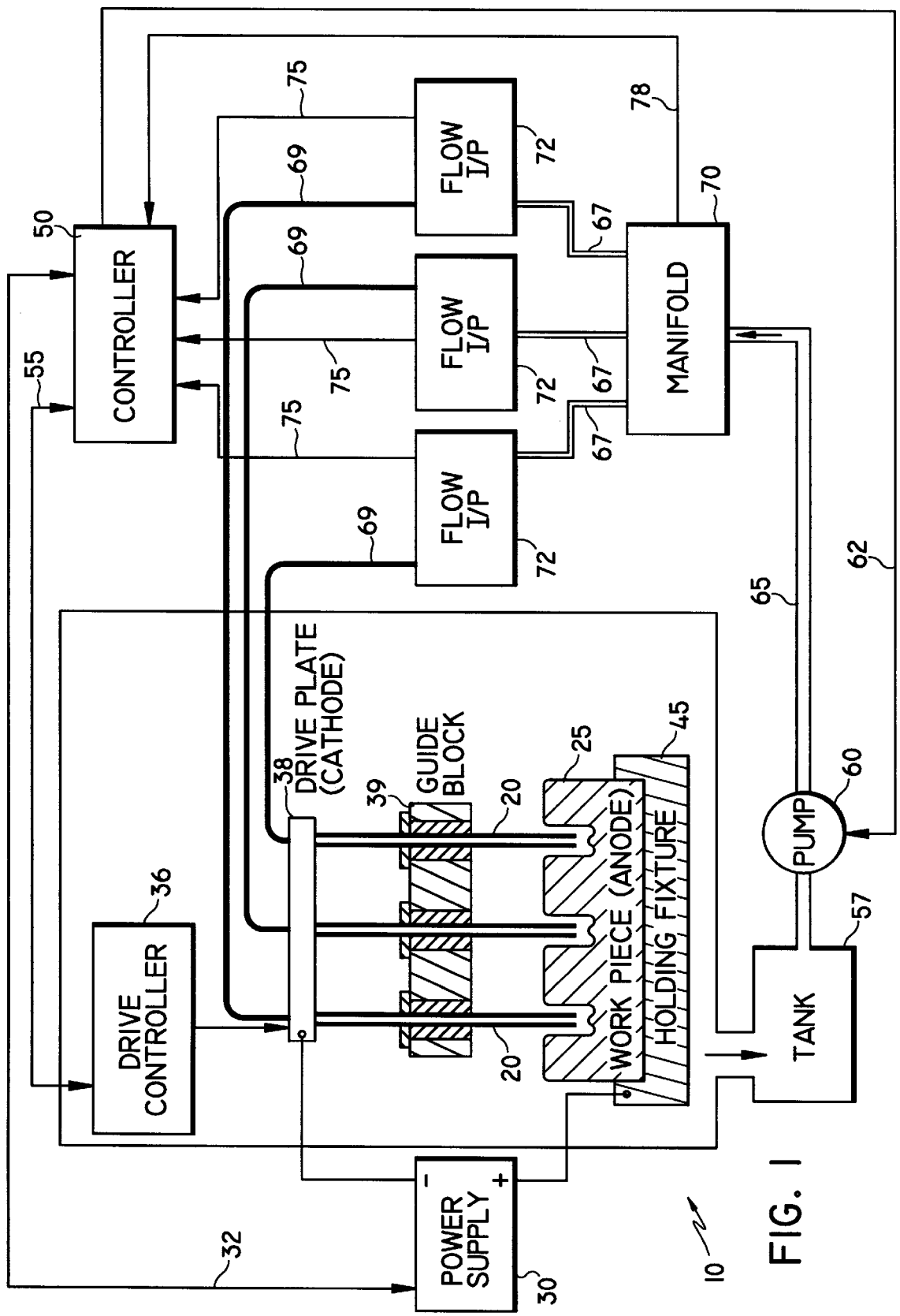
FIG. 1 is a schematic block diagram of an electrochemical machining apparatus incorporating features of the present invention.

As shown in FIG. 1, an electrochemical machining device 10 according to the present invention includes an array of cathode tools 20 for machining a workpiece 25, a power supply system 30 to create an electrical potential between the cathodes 20 and the workpiece 25; a drive system, preferably consisting of a drive controller 36, a drive plate 38 and a guide block 39, to move and guide the cathode tools 20 towards the workpiece 25; an electrolyte system to store and distribute the electrolyte throughout the device 10, a holding fixture 45 to position and secure the workpiece 25 during the machining operation and a controller 50. In a preferred embodiment, the electrochemical machining device 10 may be embodied as a conventional ECM or STEM device, as modified herein to provide enhanced control capabilities. In the illustrative embodiment, the electrochemical machining device 10 is embodied as a STEM device.

The cathode tools 20 are preferably insulated on their outer diameter with an insulating coating to prevent contact with the metal surface of the workpiece 25 being machined. Thus, the only place where the cathodes 20 are not insulated is at their tip. As is well known, if the tip of a cathode tool 20 mistakenly contacts the metal surface of the workpiece 25 being machined, the cathode 20 is incinerated and destroyed by the rush of electrical current. Normally, however, the metal of the workpiece 28 dissolves as the cathode tip approaches the metal and contact is avoided. The geometry of the cathode tools 20 depends on the surfaces of the workpiece 25 to be machined.

As shown in FIG. 1, the negative terminal of the power supply 30 is preferably connected to the drive plate 38 and thereby to the cathode tools 20. The positive terminal of the power supply system 30 is preferably connected to the metallic holding fixture 45 and thereby to the workpiece 25. Thus, the workpiece 25 serves as the anode in the created electrical circuit. As discussed further below, upon circulation of the electrolyte through the cathode tools 20, and application of a voltage by the power supply system 30, a current will flow through the electrolyte between the anodic workpiece 25 and the cathode tools 20, thereby creating electrolytic action.

The power supply 30 is preferably a low voltage DC power supply, supplying voltage on the order of 15 volts DC between the tip of the cathode tools 20 and the metal workpiece 25, and supplying current on the order of 10–20 amps per hole. The power supply 30 preferably includes contact sense and spark detection protection circuitry, in a known manner. As with conventional STEM systems, the power supply 30 is preferably capable of applying a reverse direction polarity in order to expel metal which has plated on the tip of the cathodes 20. In this manner, during the machining operation, the voltage is periodically reversed, to remove metal build up from the tip of the cathode tools 20. In one embodiment, the power is reversed for approximately 0.05 seconds every 5 seconds. The power supply system 30 preferably provides real-time current and voltage parameter values to the controller 50 by means of a bidirectional data connection 32.

As with conventional STEM systems, the tooling in the electrochemical machining device 10, including the cathode tools 20, the holding fixture 45, the guide block 39 and the drive plate 38, is preferably made of titanium. The guide block 39 positions and guides the cathode array 25 while the drive plate 38 fastens the cathodes into their array.

The drive controller 36 controls the movement of the drive plate 38 and preferably provides feedback values of depth (z) and drive speed to the controller 50 by means of a bidirectional data connection 55. In one embodiment, the drive plate 38 may be advanced by means of a linear bearing assembly and a ball screw drive system driven by a programmable servo-controlled or stepper motor allowing a variable rate feed.

As shown in FIG. 1, the electrolyte system preferably includes a storage tank 57 for containing the electrolyte solution, a pump 60 for circulating the electrolyte solution through the electrochemical machining device 10 at a desired flow rate through piping 65, 67, 69. The desired flow rate is preferably provided to the pump 60 by the controller 50 via a data connection 62. The electrolyte solution is circulated to a feed manifold 70, via inlet line 65. Thereafter, the solution is distributed to each individual cathode tool 20 by means of feed lines 67 and 69. Typically, the electrolyte solution utilized for STEM drilling is 5 to 25 percent acid in solution, such as sulfuric, hydrochloric or nitric acid. The flow of the electrolyte solution through each line 67, 69 is preferably regulated and monitored by flow inputs 72, containing in-line flow meters. The flow rate parameter measurements made by the in-line flow meters are preferably provided to the controller 50 by means of data connections 75. As discussed further below, system pressure is preferably measured by a transducer at the feed manifold 70. The measured system pressure value is preferably provided to the controller 50 by means of a data connection 78.

According to features of the present invention, discussed further below, the controller 50 monitors a number of system parameters in real time and provides alarm features and feedback control by means of an adaptive control loop to achieve more accurate machining of the workpiece 25 and to avoid a failure before it occurs. For example, if the electrochemical machining device 10 is machining cooling holes in a turbine blade having a foil and a shank, the controller 50 balances the controlling variables to achieve smooth cooling holes through the foil and the shank, respectively, which are straight enough to intersect their mate, and which avoid drifting too close to a wall. In addition, the controller 50 ensures that the cathode tools 20 do not create a large bulb, or touch the metal and thereby burn up the cathodes. Likewise, as discussed further below, if the electrochemical machining device 10 is machining the surfaces of a workpiece, the controller 50 balances the controlling variables to achieve improved uniformity and quality of the final machined part, and to avoid contact between the electrode tools and the workpiece.

As discussed further below in conjunction with FIGS. 3 through 8, the controller 50 preferably balances a number of controlling variables, such as drive feed rate, electrolyte flow rate and voltage, in response to current system parameters. Conceptually, an increase in the drive rate will cause the hole diameter to decrease and an increase in the voltage will cause the hole diameter to increase. The effect of a change in the flow rate, however, will depend on a number of factors including the clarity of the acid. Thus, in the illustrative embodiment, the flow rate is preferably held constant.

In a preferred embodiment, the controller 50 monitors the following parameters in order to adjust the controlling variables: the drive parameters of feed rate and cathode depth, as received from the drive controller 36; the pump parameters of flow rate, as measured by the in-line flow meters in the flow inputs 72, and pressure, as measured by the pressure transducer installed in the manifold 70; and the power components of voltage and current, as received from the power supply system 30. The flow rate in each of the cathode tools 20 is preferably utilized to provide an alarm to the operator if a statistically significant change in flow is detected, as discussed below in conjunction with FIG. 3.

According to a feature of the present invention, the dynamic fluid resistance across one or more of the holes being drilled is utilized to approximate the diameter of the holes being cut in real time. Specifically, as discussed below in conjunction with FIG. 5, it is the flow resistance gradient, or the slope of the dynamic fluid resistance with depth, which correlates with hole diameter and is used to control the process. The approximated hole diameter value can be effectively utilized to provide feedback control of one or more of the controlling variables to obtain improved results. As discussed further below in conjunction with FIGS. 3 and 5, the controller 50 calculates the dynamic fluid resistance from a number of the monitored parameters. Conceptually, dynamic fluid resistance is the resistance of the hole being drilled net of the nonchanging, static fluid resistances of the individual flow tubes and the individual cathodes of the electrolyte system. Generally, if the dynamic fluid resistance gradient increases, the hole diameter is decreasing. This information is utilized for the feedback control loop. The dynamic fluid resistance is the difference between the total measured fluid resistance and the static fluid resistance, which is obtained during a calibration procedure discussed below in conjunction with FIG. 9.

Figure 2:
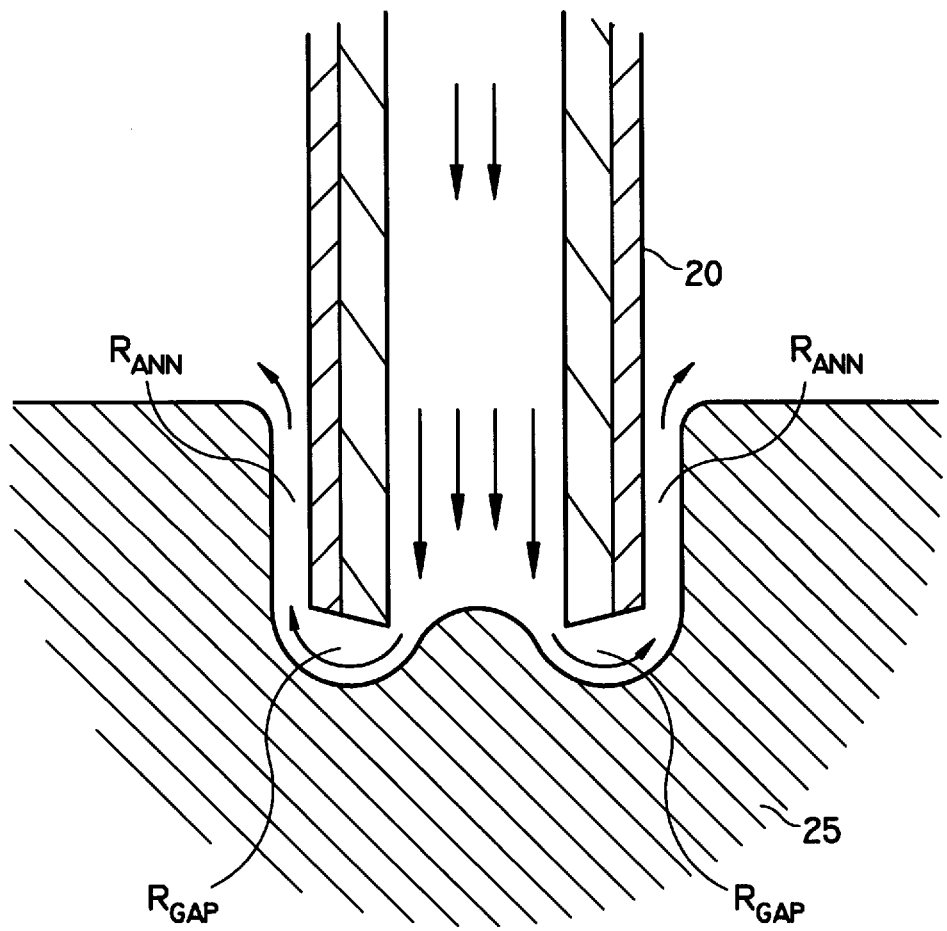
FIG. 2 illustrates a cathode tube being fed into a workpiece in order to machine a hole therein.

As illustrated in FIG. 2, dynamic fluid resistance is the sum of two restrictions to flow: the gap resistance, $R_{gap}$, between the tip of the cathode 20 and the workpiece 25 and the annulus resistance, $R_{ann}$, between the hole diameter being cut and the outer diameter of the cathode 20 performing the cutting. The annulus resistance, $R_{ann}$, is the annulus size times the depth of the hole being cut. Thus, deeper holes have a higher annulus resistance, $R_{ann}$. It is noted that both gap resistance, $R_{gap}$, and annulus resistance, $R_{ann}$, increase as the hole size gets smaller.

Conceptually, the total fluid resistance is a function of two variables: the geometry of the system through which the electrolyte flows plus the velocity, or flow rate, of the circulating electrolyte. Since the flow rate is held constant in the preferred embodiment, then the total fluid resistance is the function of only the fluid system geometry. As indicated above, the total fluid resistance in the device 10 is the sum of three resistances: the static resistance, $R_{STAT}$, representing the fluid resistance of everything in the fluid system prior to the gap, plus the gap resistance, $R_{gap}$, and the annulus resistance, $R_{ann}$. Thus, by subtracting the calibrated static fluid resistance from the total measured fluid resistance, the resultant dynamic fluid resistance is attributable solely to the fluid resistance through the hole being drilled, which is the geometry of interest. It is worth noting, however, that while the electrical resistance is directly related to the rate of metal removal, it is the function of both the geometry and the conductivity of the electrolyte. The conductivity is the function of a number of variables, however, including the metal content and the temperature of the electrolyte. Thus, using only electrical resistance, it is not possible to isolate the components attributable solely to the geometry of the hole, as with fluid resistance.

As indicated above, dynamic fluid resistance is the difference between the total measured fluid resistance and the static fluid resistance. Total measured fluid resistance is the pressure measured at the manifold 70 divided by the kinetic pressure. Kinetic pressure is the energy available from kinetic energy and is calculated as fluid density times velocity in the cathode squared, divided by 2 times the gravitational constant as follows:

$$P_{KE} = \rho V^2 / 2 g_0$$

It is noted that while the measured pressure at the manifold 70 is the same for all holes, each hole has an individual flow rate and thus has an individual total pressure.

Static fluid resistance is also different for each cathode 20, but is the same for each hole drilled by the respective cathode 20. Static fluid resistance results from the fluid resistance of the cathode tubes 20 and the tubing 67, 69 attaching the cathode to the manifold. Each flow rate in a cathode 20 produces a different static fluid resistance. The instantaneous static fluid resistance is calculated using the flow rate and the cathode diameter.

The static fluid resistance for each cathode is preferably determined by performing a calibration procedure before the cutting operation takes place. An illustrative calibration procedure is discussed below in conjunction with FIG. 9. As discussed below, static fluid resistance will be consistent in time provided certain precautions are followed. Preferably, the static fluid resistance of each cathode is obtained over a range of Reynolds number flows. In other words, the electrochemical machining device 10 is calibrated over the Reynolds numbers expected during operation. The calibration values will hold until the hardware is changed.

In order to accurately net out the static fluid resistance when calculating the dynamic fluid resistance, the static fluid resistance values must be accurate and reproducible. It has been found that the static fluid resistance of a cathode is stable only over a part of the flow range typically used for STEM drilling. Thus, in order to maintain stability, it is important to limit flow to the stable range. The heart of the unstable range is the well known "transition flow range", established by Moody in pipe flow. Transition flow takes place at Reynolds numbers from 2000 to 3000. Fluid flowing in pipes and increasing in velocity shifts from smooth laminar flow to excited turbulent flow passing through an unstable, unpredictable flow regime called the transition region. While the static fluid resistance values in both the laminar and turbulent regimes are consistent and repeatable in time, the static fluid resistance values in the transition zone are not.

Thus, in a preferred embodiment, the pump, under control of the controller 50, limits the flows to the turbulent region. While the static fluid resistance values in the laminar regime are quite stable within a cathode, it has been found that the static fluid resistance values are not stable cathode to cathode.

In addition to utilizing the dynamic fluid resistance as an indication of hole diameter, it has been found that the dynamic electrical resistance can also provide an indication of hole diameter. Thus, in one embodiment, separate approximations of the hole diameter are obtained from the fluid resistance and electrical resistance at the gap, respectively. The separate approximations are then combined to obtain a more accurate indication of the hole diameter.

MONITORING AND FEEDBACK CONTROL PROCESSES

Figure 7:
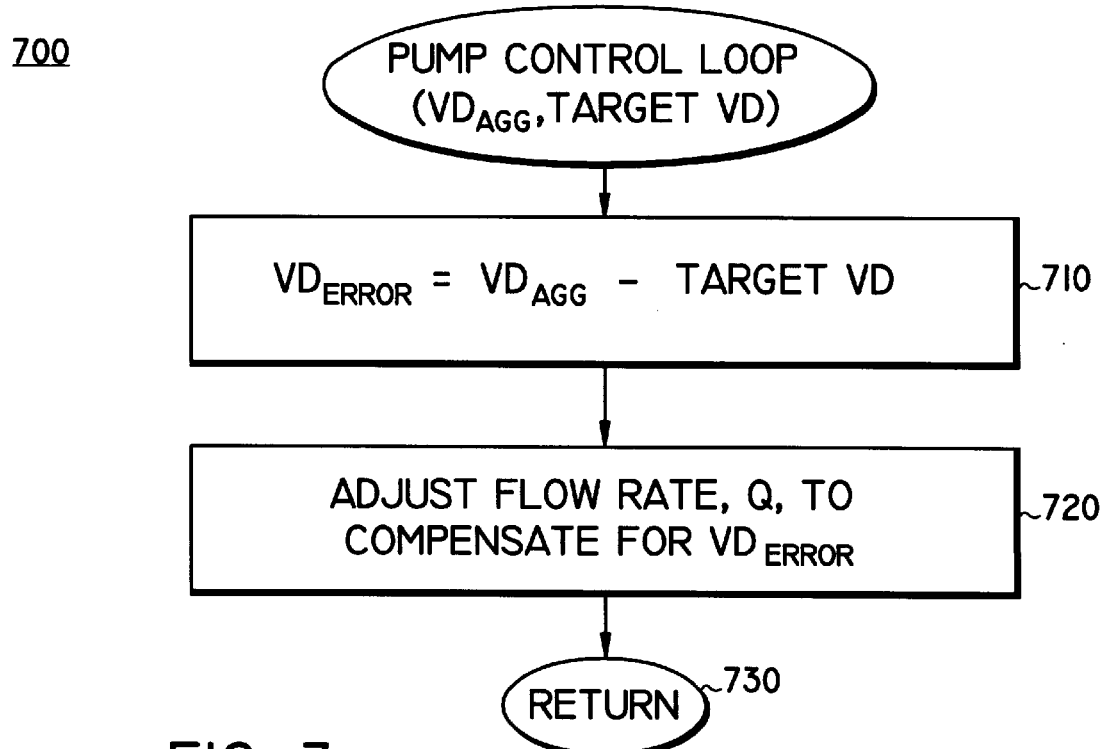
FIG. 7 is a flow chart describing an exemplary pump control loop as utilized by the monitor and control process of FIG. 3 to adjust the flow rate of the electrolyte circulating through the system of FIG. 1.
Figure 8:
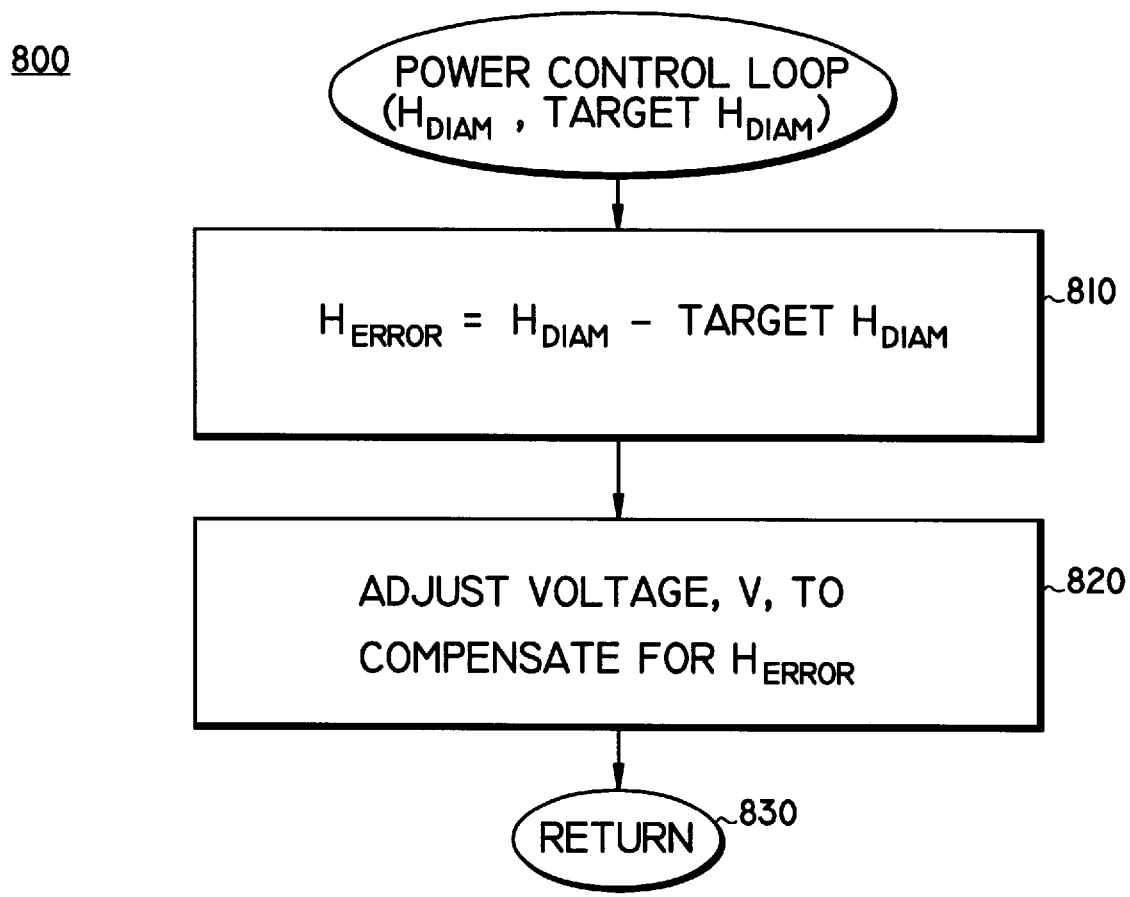
FIG. 8 is a flow chart describing an exemplary power control loop as utilized by the monitor and control process of FIG. 3 to adjust the voltage of the power supply shown in FIG. 1.

To balance the controlling variables, the controller 50 preferably utilizes three controller loops: a drive control loop 600 (FIG. 6), a pump control loop 700 (FIG. 7) and a power supply voltage control loop 800 (FIG. 8). In one preferred embodiment, each controller loop is embodied as a PID controller object which can preferably be run in a manual, programmed or automatic mode as desired. Manual mode is an open loop controller which requires the operator to adjust the system parameters manually. Programmed mode is an open loop controller with the controller 50 supplying the system parameter changes. Finally, automatic mode is a closed loop controller with feedback based on a reference parameter.

Figure 6:
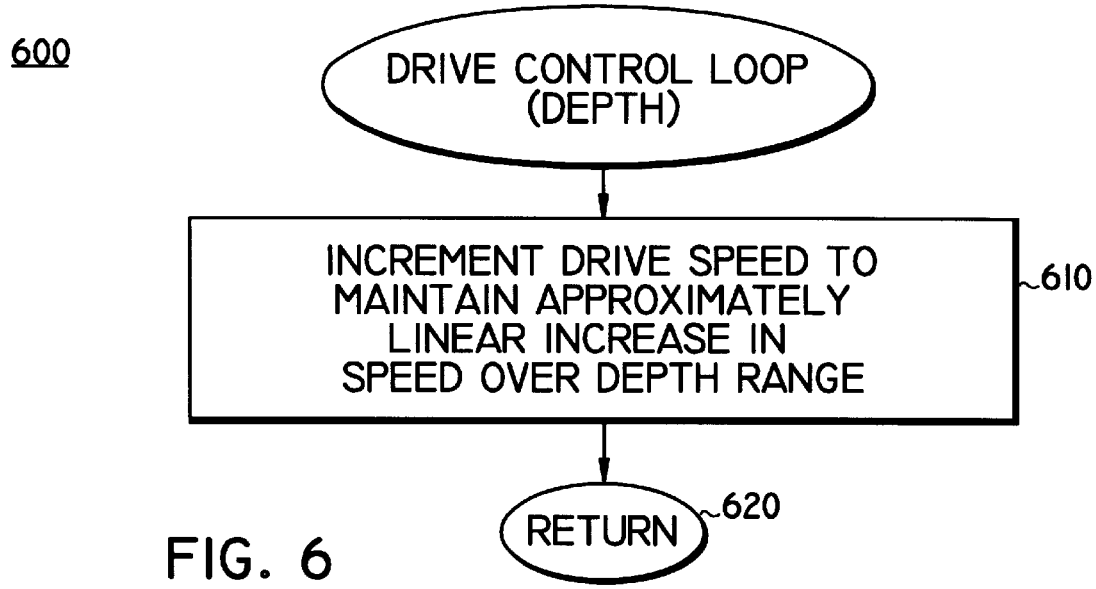
FIG. 6 is a flow chart describing an exemplary drive control loop as utilized by the monitor and control process of FIG. 3 to adjust the drive speed of the cathodes shown in FIG. 1.

In the illustrative embodiment described herein, the drive control loop 600 is run in the programmed mode and the pump control loop 700 and power supply voltage control loop 800 are run in the automatic mode. The drive control loop 600, discussed further below in conjunction with FIG. 6, is illustratively programmed to achieve a linear gradual increase in the drive speed setting as a function of the hole depth. The illustrative pump control loop 700, discussed further below in conjunction with FIG. 7, is operated in an automatic mode to maintain the flow rate to a desired Reynolds number, regardless of the system pressure. The illustrative power supply voltage control loop 800, discussed further below in conjunction with FIG. 8, is operated in an automatic mode to adjust the voltage controls, based on the fluid resistance gradient. In this manner, by varying the voltage in response to the slope of dynamic fluid resistance, the diameter of the holes may be held nearly constant.

CONTROLLER PROCESSES

Figure 3:
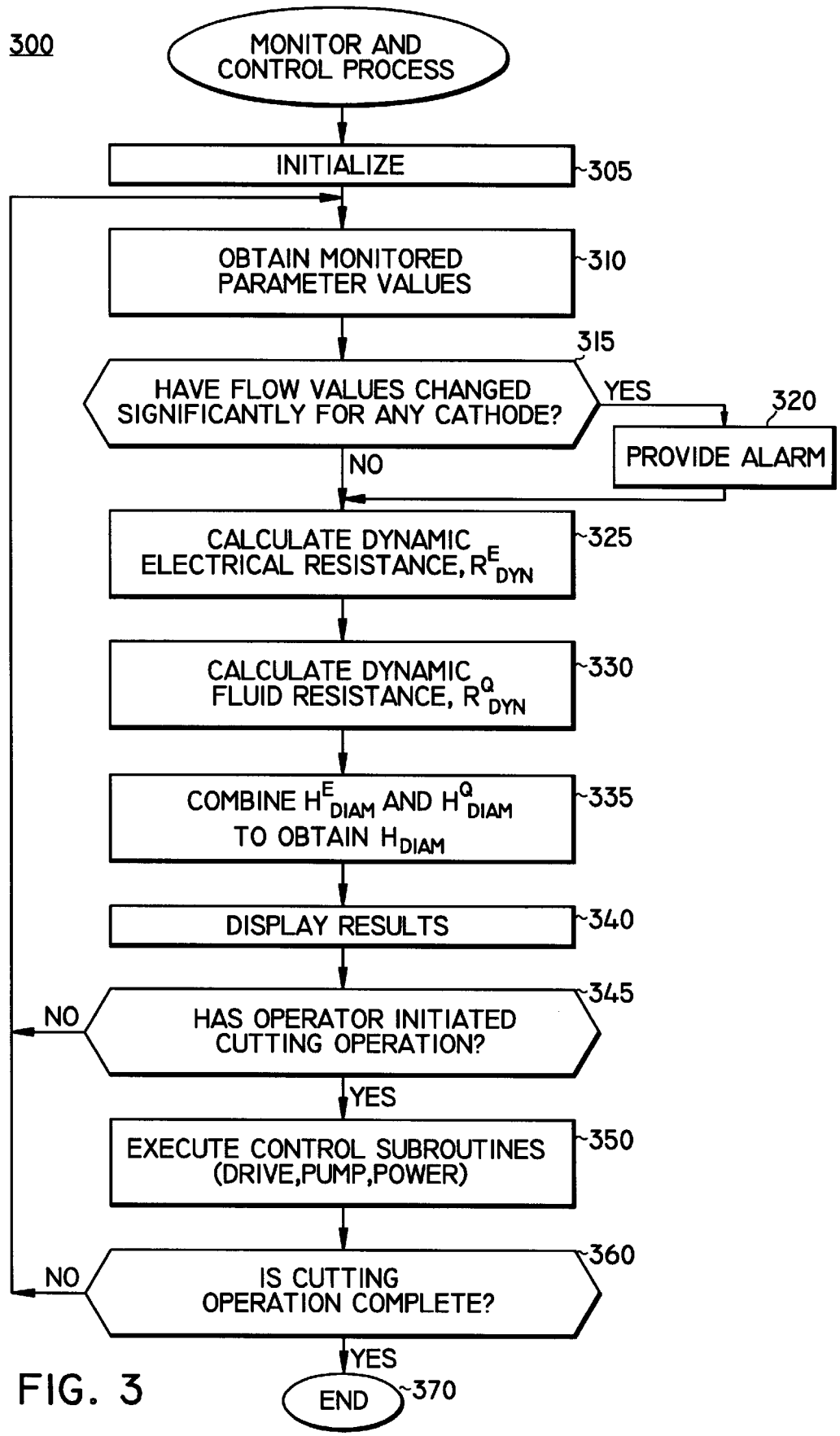
FIG. 3 is a flow chart describing an exemplary monitor and control process as implemented by the controller of FIG. 1.

FIG. 3 illustrates the main process of the controller 50. The monitor and control process 300 illustrated in FIG. 3 performs an initialization routine during step 305 which includes obtaining the required control constants, calibration information, process parameters, and part characteristics. Thereafter, during step 310, the controller 50 obtains current readings for each of the parameters which are monitored by the controller 50. As indicated above, the controller 50 preferably monitors the following parameters: the drive parameters of feed rate and cathode depth; the pump parameters of flow rate and pressure; and the power components of voltage and current. In a preferred embodiment, each of the parameters are measured approximately every five seconds.

During step 315, a test is performed to determine if the flow rate through each tube has changed significantly over prior readings. If it is determined during step 315 that the flow rate through each tube has changed significantly over prior readings, an alarm will be provided to the operator or machine control during step 320. If, however, it is determined during step 315 that the flow rate through each tube has not changed significantly over prior readings, then program control will continue directly to step 325. In this manner, if a single hole has dramatically changed, it will be alarmed and the machine can be halted before a total failure. Alternatively, the alarm condition can be based on the calculated hole diameter approximation.

Thereafter, the dynamic electrical resistance, $R^E_{DYN}$, is preferably calculated during step 325. One illustrative method for calculating the dynamic electrical resistance, $R^E_{DYN}$, is discussed below in conjunction with FIG. 4. The dynamic fluid resistance, $R^Q_{DYN}$, is preferably calculated during step 330. One illustrative method for calculating the dynamic fluid resistance, $R^Q_{DYN}$, is discussed below in conjunction with FIG. 5. As discussed below, each of the routines which calculate the dynamic electrical resistance, $R^E_{DYN}$, and the dynamic fluid resistance, $R^Q_{DYN}$, also obtain an approximation of the hole diameter based on the slope of the dynamic electrical resistance, $R^E_{DYN}$, and the dynamic fluid resistance, $R^Q_{DYN}$, respectively. The two approximated hole diameters, $H^E_{DIAM}$ and $H^Q_{DIAM}$, calculated during steps 325 and 330, respectively may optionally be combined during step 335 to obtain a more accurate estimate of the hole diameter, $H_{DIAM}$.

A visual representation of one or more of the parameters measured during step 310 and the values calculated during steps 325 through 335 are preferably provided to the operator during step 340. In a preferred embodiment, the particular measured parameters and calculated values presented to the operator can be placed under user control.

It is noted that the foregoing monitoring steps, including the data acquisition and calculation steps, can be performed by the controller 50 even before the actual cutting by the electrochemical machining device 10 begins. Once the operator actually initiates the cutting operation, however, the controller 50 preferably utilizes the information obtained during steps 310 through 335 for adaptive control of the system process.

Thus, a test is performed during step 345 to determine if the operator has initiated the cutting operation by the electrochemical machining device 10. If it is determined during step 345 that the operator has not yet initiated the cutting operation by the electrochemical machining device 10, program control will return to step 310 to continue monitoring the system parameters. If, however, it is determined during step 345 that the operator has initiated the cutting operation by the electrochemical machining device 10, the information obtained during steps 310 through 335 is utilized by the controller 50 during step 350 to provide adaptive control of the controlling variables. As indicated above, the controller 50 preferably utilizes three controller loops to adjust the controlling variables: a drive control loop 600, discussed below in conjunction with FIG. 6, a pump control loop 700, discussed below in conjunction with FIG. 7, and a power supply voltage control loop 800, discussed below in conjunction with FIG. 8.

Thereafter, the controller 50 will perform a test during step 360 to determine if the cutting operation is complete. If it is determined during step 360 that the cutting operation is not complete, program control will return to step 310 to continue monitoring and feedback control of the process. If, however, it is determined during step 360 that the cutting operation is complete, program control will terminate during step 370.

Figure 4:
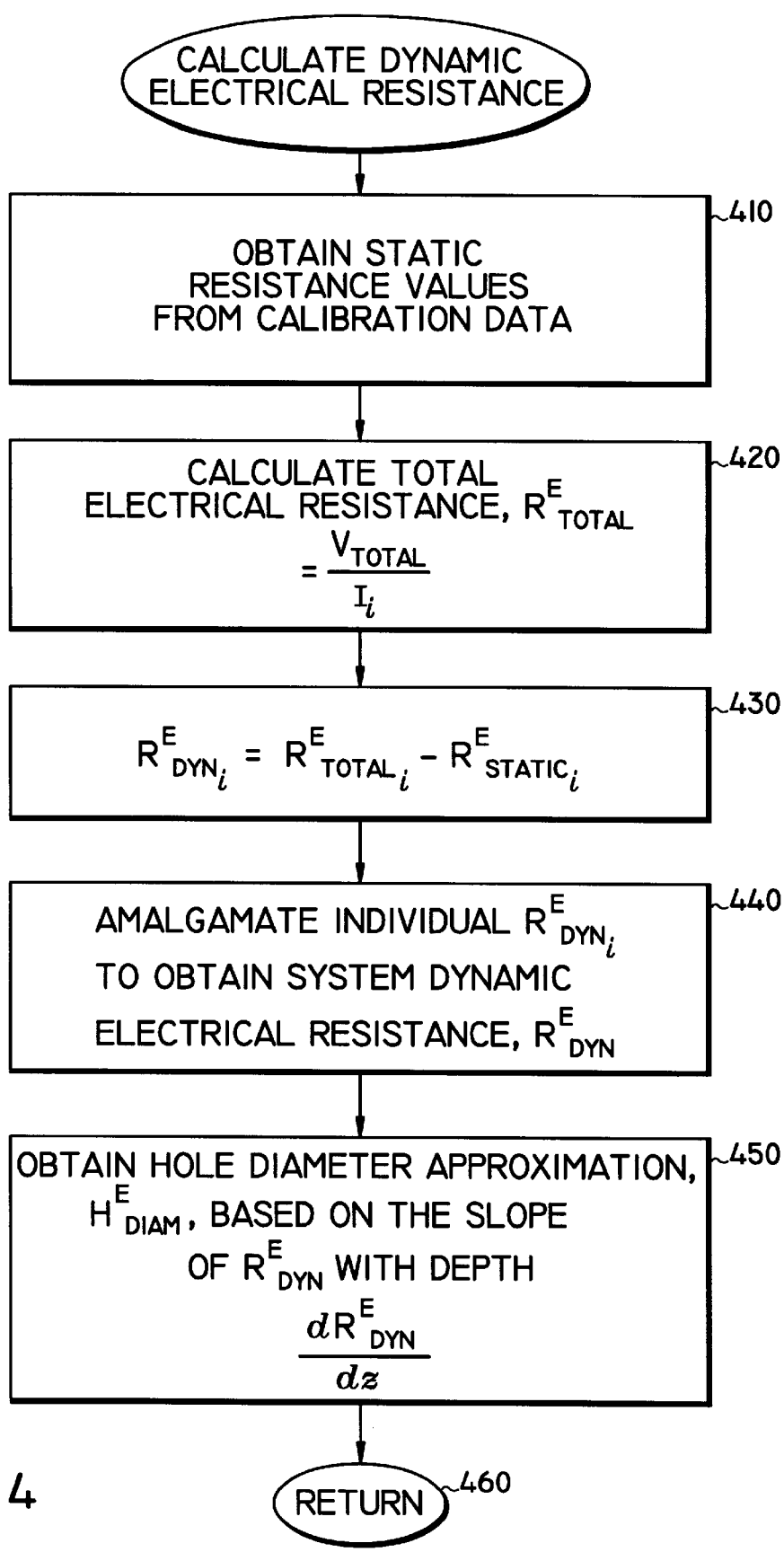
FIG. 4 is a flow chart describing an exemplary technique for calculating dynamic electrical resistance, $R^E_{DYN}$, as utilized by the monitor and control process of FIG. 3.

An illustrative routine 400 for calculating the dynamic electrical resistance, $R^E_{DYN}$, is shown in FIG. 4. Conceptually, the dynamic electrical resistance, $R^E_{DYN}$, is calculated in much the same way as the dynamic fluid resistance, $R^Q_{DYN}$. In other words, the dynamic electrical resistance, $R^E_{DYN}$, which is the resistance across the gap between the cathode tip and the workpiece, is obtained by eliminating the static resistance from the total measured resistance. Thus, the static resistance values are preferably obtained from the calibration data during step 410. During the electrical calibration procedure, the static resistance of all of the wires and cathodes in the electrical system are obtained. The various static resistance values can be measured off-line using an ohmmeter or approximated based on information known about the materials. The static resistance is preferably measured on a per tube basis over the range of expected currents.

Thereafter, the total electrical resistance, $R^E_{TOT}$, is calculated during step 420 based on the total measured system voltage, $V_{TOT}$, as supplied by the power supply system 30, and the current measured through each cathode 20, according to the following equation:

$$R^E_{TOT} = \frac{V_{TOT}}{Ii}$$

It is noted that in order to obtain the current through each of the cathode tools 20, each of the cathodes must be electrically isolated with an amp-meter placed inline.

The actual dynamic electrical resistance, $R^E_{DYNi}$, for each tube is thereafter calculated during step 430 based on the difference between $R^E_{TOTi}$ and $R^E_{STATi}$, for each tube. During step 440, the individual values of dynamic electrical resistance, $R^E_{DYNi}$, for each tube are amalgamated to obtain a system dynamic electrical resistance, $R^E_{DYN}$. In one embodiment, the amalgamated dynamic electrical resistance, $R^E_{DYN}$, is obtained by taking the median of each individual $R^E_{DYNi}$ value.

According to a feature of the present invention, an approximation of the hole diameter, $H^E_{DIAM}$, is obtained during step 450 based on the slope of $R^E_{DYN}$, with depth. The approximated hole diameter, $H^E_{DIAM}$, is thereafter preferably returned during step 460 to the main monitor and control process (FIG. 3) for further processing.

An illustrative routine 500 for calculating the dynamic fluid resistance, $R^Q_{DYN}$, is shown in FIG. 5. As previously indicated, the dynamic fluid resistance, $R^Q_{DYN}$, is the fluid resistance across the gap between the cathode tip and the workpiece and the fluid resistance through the annulus, and is obtained by eliminating the static fluid resistance from the total measured fluid resistance. As discussed below in conjunction with FIG. 9, the static fluid resistance values are preferably stored by the fluid calibration routine 900 indexed by the Reynolds number. Thus, the Reynolds number, VD, for each tube is preferably calculated during step 510 for the current measured flow rate in each tube, $Q_i$, according to the following equation:

$$VD_i = \frac{C[Q_i]}{A_{TUBEi}} \times DIAM_{INi}$$

Thereafter, the static fluid resistance values are preferably obtained during step 520 from the stored calibration data based on the Reynolds numbers calculated during the previous step.

Thereafter, the total fluid resistance, $R^Q_{TOT}$, is calculated during step 530 based on the total measured system pressure, $P_{TOT}$, as supplied by the transducer in the manifold 70, and the flow measured through the area of the annulus, $A_{ANN}$, for each cathode 20, according to the following equation:

$$R^Q_{TOT} = \frac{P_{TOT}}{C[Q_i/A_{ANN}]^2}$$

It is noted that the area of the annulus, $A_{ANN}$, can be obtained by the following equation, where the notation OD represents the outer diameter of the respective cathode:

$$\pi/4[D^2_{HOLE} - D^2_{OD}].$$

The actual dynamic fluid resistance, $R^Q_{DYNi}$, for each tube is thereafter calculated during step 540 based on the difference between $R^Q_{TOTi}$ and $R^Q_{STATi}$, for each tube. In other words, the dynamic fluid resistance, $R^Q_{DYN}$, is the fluid resistance netted of all components which depend on something other than hole diameter. During step 550, the individual values of dynamic fluid resistance, $R^Q_{DYNi}$, for each tube are amalgamated to obtain a system dynamic fluid resistance, $R^Q_{DYN}$. In one embodiment, the amalgamated dynamic fluid resistance, $R^Q_{DYN}$, is obtained by taking the median of each individual $R^Q_{DYNi}$ value. The median can be utilized because the use of the Reynolds numbers has removed the dependency of the flow rate on a particular diameter.

According to a feature of the present invention, an approximation of the hole diameter, $H^Q_{DIAM}$, is obtained during step 560 based on the slope, or flow resistance gradient, of $R^Q_{DYN}$, with depth. The slope of $R^Q_{DYN}$, with depth is obtained by taking the derivative of $R^Q_{DYN}$ with respect to depth, z. It is noted that the current hole diameter is closely correlated to the flow resistance gradient. In fact, while the resistance across the gap, $R_{gap}$, and the instantaneous resistance through the annulus, $R_{ANN}$, correlate to the gap between the workpiece and the cathode tool, it is the historical annulus resistance which is most closely related to the hole diameter. Thus, in order to maximize the fluid resistance component attributable to the hole diameter, as opposed to gap fluctuations, it is important to utilize a portion of the historical data for the annulus.

The approximated hole diameter, $H^Q_{DIAM}$, is thereafter preferably returned during step 570 to the main monitor and control process (FIG. 3) for further processing.

As previously indicated, the controller 50 preferably utilizes a drive control loop 600 (FIG. 6) to control the feed rate of the array of cathode tools 20. In a preferred embodiment, the drive control loop 600 is preferably operated in a programmed or an open loop controller mode. The drive control loop 600 receives the current value of the depth of the cathode tools 20 and serves to increment the drive speed to achieve an approximately linear increase in the drive rate as the depth increases, as shown in step 610. The drive speed can be varied by sending a control signal to the drive controller 36.

As discussed above, the controller 50 preferably utilizes a pump control loop 700 to control the flow rate, Q, to a desired Reynolds number in a closed loop feedback mode. In a preferred embodiment, the flow rate, Q, is held to a constant Reynolds number. Thus, the pump control loop 700 receives an aggregation, $VD_{AGG}$, of the Reynolds numbers calculated during step 510 of the dynamic fluid resistance calculation routine (FIG. 5), as well as the target Reynolds number. The Reynolds number, as opposed to the flow rate, is preferably utilized because of the potentially different size cathodes in the array. The error between the measured aggregate Reynolds number and the target Reynolds number is calculated during step 710 and the flow rate, Q, is adjusted during step 720 to compensate for the calculated Reynolds number error, $VD_{ERR}$. The flow rate can be varied by sending a control signal to the pump 60.

The controller 50 preferably utilizes a power supply voltage control loop 800 to control the system voltage, V, in a closed loop feedback mode in response to the approximated hole diameter, $H_{DIAM}$. Thus, the power supply voltage control loop 800 receives the approximated hole diameter, $H_{DIAM}$, as calculated by the controller 50 during step 335 of the main monitor and control process (FIG. 3), as well as the target hole diameter. The hole diameter error, $H_{ERR}$, between the approximated hole diameter, $H_{DIAM}$, and the target hole diameter is calculated during step 810 and the system voltage, V, is adjusted during step 820 to compensate for the calculated hole diameter error, $H_{ERR}$. The voltage can be varied by sending a control signal to the power supply 30. It is noted that if the voltage adjustment were to place the voltage value outside a voltage boundary, the controller 50 can send a control signal to the drive controller 36 to adjust the drive rate, which will serve to reposition the voltage value within the desired range.

Figure 9:
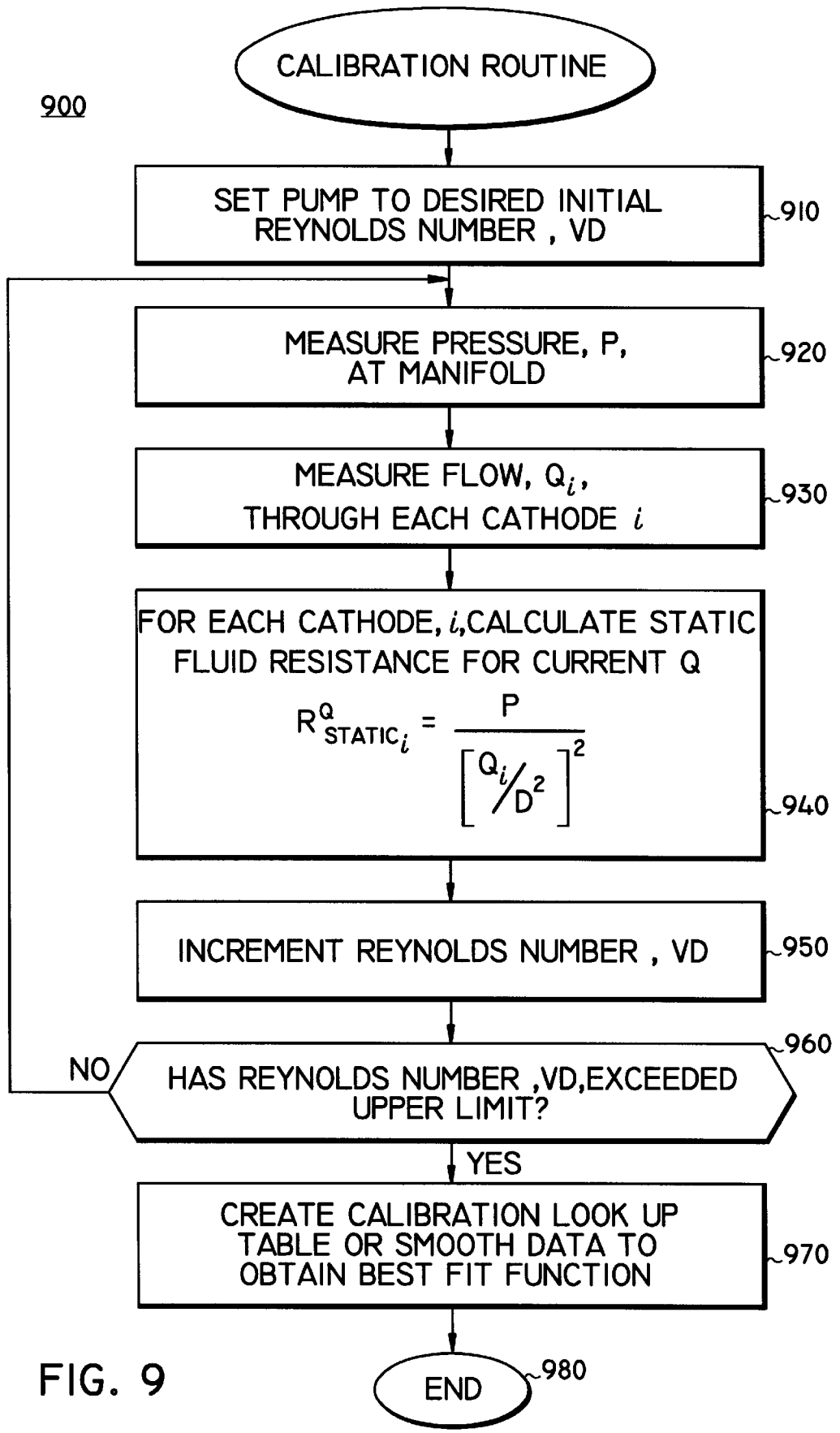
FIG. 9 is a flow chart describing an exemplary calibration routine as utilized by the controller of FIG. 1 to obtain the static fluid resistance values utilized in the dynamic fluid resistance, $R^Q_{DYN}$, calculation of FIG. 5.

As indicated above, a calibration routine is preferably executed prior to performing the actual machining operation in order to obtain the static resistance values. An illustrative calibration routine 900 for calculating the static fluid resistance is shown in FIG. 9. The calibration routine 900 is performed on a per tube basis over the range of expected Reynolds numbers. The calibration routine 900 calculates the static fluid resistance of each tube for a given Reynolds number and thereby serves to net out the fluid resistance of all but the hole.

As shown in FIG. 9, the calibration routine 900 initially sets the pump 60 to a desired initial Reynolds number, VD, during step 910. Thereafter, the system pressure, P, at the manifold 70 is measured during step 920, and the flow, $Q_i$, through each cathode 20 is measured during step 930. For each cathode, i, the static fluid resistance is calculated for the current Reynolds number, VD, according to the following equation:

$$RQ_{STATi} = \frac{C[P]}{[Q_i/D^2]^2}$$

Thereafter, the current Reynolds number, VD, is incremented during step 950, and a test is performed during step 960 to determine if the Reynolds number, VD, has exceeded an upper limit. In other words, it is determined whether there are additional Reynolds numbers over which the system is to be calibrated. If it is determined during step 960 that the Reynolds number has not exceeded the upper limit, program control will return to step 920 to continue calibration of the system for the new Reynolds number. If, however, it is determined during step 960 that the current Reynolds number, VD, has exceeded the upper limit, then calibration data has been obtained for each tube over the entire range of expected Reynolds numbers.

A calibration look up table is created during step 970, or, alternatively, the calibration data can be smoothed to obtain a "best fit function", in a known manner. Thereafter, program control terminates during step 980.

While the principles of the present invention have been illustrated in the context of cavity machining, and specifically in the context of STEM drilling, they are likewise applicable to contour machining, as would be apparent to a person of ordinary skill. In the same manner that dynamic fluid resistance is utilized to obtain an approximation of the diameter of the hole being cut in a STEM process, the dynamic fluid resistance may be utilized to obtain an approximation of the shape of a workpiece being machined in an ECM process, by estimating the gap between the electrodes and the workpiece.

Due to the larger scale of the gap between the electrodes and workpiece in an ECM system, compared to the smaller cathodes in a STEM system, it is possible to directly measure the pressure across the gap by placing a transducer at the input and output of the gap. It is likewise possible to measure the flow of electrolyte through the gap. In this manner, the dynamic components of the fluid resistance are directly measured, and the static fluid resistance components have already been eliminated. Thus, if reference data is obtained for the series of incremental steps between the initial electrode position, where the workpiece has a rough shape, to the final electrode position, where the workpiece has the final desired shape, and over the range of expected pressure values, the flow rate versus gap is obtained. In other words, for each incremental step, pressure, flow rate and the gap are evaluated.

Thereafter, during each production run, as the electrodes are progressed through each incremental step, the pressure and flow through the gap are measured and the reference data can be accessed to obtain the reference gap. The controlling variables can thereafter be adjusted to maintain the gap within desired tolerances.

It is to be understood that the embodiments and variations shown and described herein are illustrative of the principles of this invention only and that various modifications may be implemented by those skilled in the art without departing from the scope and spirit of the invention.

We claim:

1. A method of estimating a shape of an anodic workpiece being machined in an electrochemical machining process in which a cathode tool is utilized to electrochemically machine said workpiece to a desired shape using an electrolyte flowing through a machining area defined between the tool and said workpiece, wherein the electrolyte has a flow rate through said machining area and a pressure associated therewith, said method comprising the steps of:

monitoring the flow rate and the pressure associated with the electrolyte flowing through said machining area;

calculating a dynamic fluid resistance of said electrolyte flowing through said machining area based on the flow rate and the pressure; and obtaining the estimation of the shape of the workpiece based on a slope of said dynamic fluid resistance.

2. The method according to claim 1, wherein said desired shape is a hole in said workpiece, wherein the cathode tool has a static fluid resistance and a total fluid resistance associated therewith, and wherein the step of calculating comprises subtracting the static fluid resistance from the total measured fluid resistance to calculate the dynamic fluid resistance.

3. The method according to claim 2, wherein said dynamic fluid resistance calculation utilizes a representation of said flow rate that is independent of the diameter of said cathode.

4. The method according to claim 2, wherein said tool and said workpiece have an annulus therebetween, and wherein said slope of said dynamic fluid resistance is based on historical data for the fluid resistance attributable to the annulus.

5. The method according to claim 2, further comprising the step of determining said static fluid resistance by performing a calibration routine to eliminate the components of the fluid resistance attributable to system components which are upstream of said machining area.

6. The method according to claim 1, wherein said desired shape is a contour of said workpiece, wherein said machining area has a pressure drop associated therewith, wherein the tool and the workpiece have a gap therebetween, wherein the step of calculating comprises measuring the pressure drop associated with said machining area and the electrolyte flow through said machining area to calculate the dynamic fluid resistance, and wherein the step of obtaining comprises estimating the gap between the tool and the workpiece to obtain the estimation of the shape.

7. The method according to claim 1, further comprising the step of calculating a dynamic electrical resistance across said electrolyte flowing through said machining area so that the accuracy of said estimated shape can be improved based on the dynamic electrical resistance.

8. The method of claim 1, wherein the tool has a depth associated therewith, and wherein the step of obtaining comprises determining a derivative of the dynamic fluid resistance with respect to the depth to determine the slope of the dynamic fluid resistance.

9. A method of estimating a diameter of a hole in an anodic workpiece being cut in an electrochemical machining process in which a cathode tool is utilized to electrochemically machine said hole in the workpiece to a desired diameter using an electrolyte flowing through a machining area defined between the tool and said hole in said workpiece, wherein the electrolyte has a flow rate through said machining area and a pressure associated therewith, said method comprising the steps of:

monitoring the flow rate and the pressure associated with the electrolyte flowing through said machining area;

calculating a dynamic fluid resistance of said electrolyte flowing through said machining area based on the flow rate and the pressure; and obtaining the estimation of the diameter of said hole based on a slope of said dynamic fluid resistance.

10. The method according to claim 9, wherein the cathode tool has a static fluid resistance and a total fluid resistance associated therewith and wherein the step of calculating comprises subtracting the static fluid resistance from the total measured fluid resistance to calculate the dynamic fluid resistance.

11. The method according to claim 9, further comprising the step of calculating a dynamic electrical resistance across said electrolyte flowing through said machining area so that the accuracy of said estimated hole diameter can be improved based on the dynamic electrical resistance.

12. The method according to claim 9, wherein said dynamic fluid resistance calculation utilizes a representation of said flow rate that is independent of the diameter of said cathode.

13. The method according to claim 9, wherein said tool and said workpiece have an annulus therebetween, and wherein said slope of said dynamic fluid resistance is based on historical data for the fluid resistance attributable to the annulus.

14. The method according to claim 9, further comprising the step of determining said static fluid resistance by performing a calibration routine to eliminate the components of the fluid resistance attributable to system components which are upstream of said machining area.

15. The method of claim 9, wherein the tool has a depth associated therewith, and wherein the step of obtaining comprises determining a derivative of the dynamic fluid resistance with respect to the depth to determine the slope of the dynamic fluid resistance.

16. An electrochemical machining process in which a cathode tool is utilized to electrochemically machine an anodic workpiece to a desired shape using an electrolyte flowing through a machining area defined between the tool and said workpiece, wherein the electrolyte has a flow rate through said machining area and a pressure associated therewith, wherein said electrochemical machining process is defined by system parameters, said method comprising the steps of:

monitoring the flow rate and the pressure;

calculating a dynamic fluid resistance of said electrolyte flowing through said machining area based on the flow rate and the pressure;

obtaining an estimation of the shape of the workpiece based on the slope of said dynamic fluid resistance; and evaluating the difference between said estimated shape and said desired shape and adjusting one or more of said system parameters to minimize said difference.

17. The method according to claim 16, wherein said desired shape is a hole in said workpiece and wherein the cathode tool has a static fluid resistance and a total fluid resistance associated therewith, and wherein the step of calculating comprises subtracting the static fluid resistance from the total measured fluid resistance to calculate the dynamic fluid resistance.

18. The method according to claim 17, wherein said flow rate is held to a constant Reynolds number.

19. The method according to claim 17, wherein said tool and said workpiece have an annulus therebetween, and wherein said slope of said dynamic fluid resistance is based on historical data for the fluid resistance attributable to the annulus between said tools and said workpiece.

20. The method according to claim 17, further comprising the step of determining said static fluid resistance by performing a calibration routine to eliminate the components of the fluid resistance attributable to system components which are upstream of said machining area.

21. The method according to claim 16, wherein said desired shape is a contour of said workpiece, wherein said machining area has a pressure drop associated therewith, wherein the tool and the workpiece have a gap therebetween, wherein the step of calculating comprises measuring the pressure drop associated with said machining area and the electrolyte flow through said machining area to calculate the dynamic fluid resistance, and wherein the step of obtaining comprises estimating the gap between the tool and the workpiece to obtain the estimation of the shape.

22. The method according to claim 16, wherein said flow rate is maintained at a desired flow rate.

23. The method according to claim 16, wherein said flow rate is maintained at a desired flow rate outside the transition zone.

24. The method according to claim 16, wherein said system parameters comprise drive parameters that include a drive feed rate which is increased as a function of depth.

25. The method according to claim 16, further comprising the step of calculating a dynamic electrical resistance across said electrolyte flowing through said machining area so that the accuracy of said estimated hole diameter can be improved based on the dynamic electrical resistance.

26. The method according to claim 16, wherein said dynamic fluid resistance calculation utilizes a representation of said flow rate that is independent of the diameter of said cathode.

27. The method of claim 16, wherein the tool has a depth associated therewith, and wherein the step of obtaining comprises determining a derivative of the dynamic fluid resistance with respect to the depth to determine the slope of the dynamic fluid resistance.

28. An electrochemical machining apparatus in which a cathode tool is utilized to electrochemically machine an anodic workpiece to a desired shape an electrolyte flowing through a machining area defined between the tool and said workpiece, wherein the electrolyte has a flow rate through said machining area and a pressure associated therewith, wherein said electrochemical machining apparatus is defined by system parameters said apparatus comprising:
means for monitoring the flow rate and the pressure;
processing means for
calculating a dynamic fluid resistance of said electrolyte flowing through said machining area based on the flow rate and the pressure;
obtaining an estimation of the shape of the workpiece based on a slope of said dynamic fluid resistance, and
evaluating the difference between said estimated shape and said desired shape; and
adjustment means for adjusting one or more of said system parameters to minimize said difference.

29. The apparatus according to claim 28, wherein said desired shape is a hole in said workpiece, wherein the cathode tool has a static fluid resistance and a total fluid resistance associated therewith, wherein the processing means calculates the dynamic fluid resistance by subtracting the static fluid resistance from the total measured fluid resistance.

30. The apparatus according to claim 29, further comprising means for holding said flow rate at a constant Reynolds number.

31. The apparatus according to claim 29, wherein said tool and said workpiece have an annulus therebetween, and wherein said slope of said dynamic fluid resistance is based on historical data for the fluid resistance attributable to the annulus.

32. The apparatus according to claim 29, further comprising means for determining said static fluid resistance by performing a calibration routine to eliminate the components of the fluid resistance attributable to system components which are upstream of said machining area.

33. The apparatus according to claim 28, wherein said desired shape is a contour of said workpiece, wherein the machining area has a pressure drop associate therewith, wherein the tool and the workpiece have a gap therebetween, wherein the processing means measures the pressure drop associated with said machining area and the electrolyte flow through said machining area, and wherein the processing means is for estimating the gap between the tool and the workpiece to obtain the estimation of the shape.

34. The apparatus according to claim 28, further comprising means for maintaining said flow rate at a desired flow rate.

35. The apparatus according to claim 28, further comprising means for maintaining said flow rate at a desired flow rate outside a transition zone between laminar and turbulent flow regimes.

36. The apparatus according to claim 28, wherein the system parameters comprise drive parameters that include a drive feed rate which is increased as a function of depth.

37. The apparatus according to claim 28, further comprising means for calculating a dynamic electrical resistance across said electrolyte flowing through said machining area and so that the accuracy of said approximated hole diameter can be improved based on the dynamic electrical resistance.

38. The apparatus according to claim 27, wherein said processing means for calculating the dynamic fluid resistance utilizes a representation of said flow rate that is independent of the diameter of said cathode.

39. The apparatus of claim 28, wherein the tool has a depth associated therewith, and wherein the processing means is operative to determine a derivative of the dynamic fluid resistance with respect to the depth to obtain the slope of the dynamic fluid resistance.

40. An electrochemical machining apparatus in which one or more cathode tools is utilized to electrochemically machine an anodic workpiece to a desired shape using an electrolyte flowing through a machining area defined between the tool and said workpiece, said electrochemical machining apparatus being defined by system parameters including drive, pump and power parameters, said apparatus comprising:
means for monitoring one or more of said system parameters, including transducers for measuring the flow rate of said electrolyte through said machining area and the electrolyte pressure;
processing means for
calculating a dynamic fluid resistance of said electrolyte flowing through said machining area;
obtaining an approximation of the shape of said machining area based on a slope of said dynamic fluid resistance, and
evaluating the difference between said approximated shape and said desired shape;
adjustment means for adjusting one or more of said system parameters to minimize said difference; and
means for calculating a dynamic electrical resistance across said electrolyte flowing through said machining area and wherein the accuracy of said approximated hole diameter is improved with information from the dynamic electrical resistance.

41. An electrochemical machining apparatus in which one or more cathode tools is utilized to electrochemically machine an anodic workpiece to a desired shape using an electrolyte flowing through a machining area defined between the tool and said workpiece, said electrochemical machining apparatus being defined by system parameters including drive, pump and power parameters, said apparatus comprising:
means for monitoring one or more of said system parameters, including transducers for measuring the flow rate of said electrolyte through said machining area and the electrolyte pressure;
processing means for
calculating a dynamic fluid resistance of said electrolyte flowing through said machining area based on a representation of said flow rate that is independent of the diameter of said cathode,
obtaining an approximation of the shape of said workpiece based on the slope of said dynamic fluid resistance, and
evaluating the difference between said approximated shape and said desired shape; and
adjustment means for adjusting one or more of said system parameters to minimize said difference.

\* \* \* \* \*